Nov. 22, 1932. H. FORD 1,888,716
HYDRAULIC SHOCK ABSORBER
Filed June 11, 1930
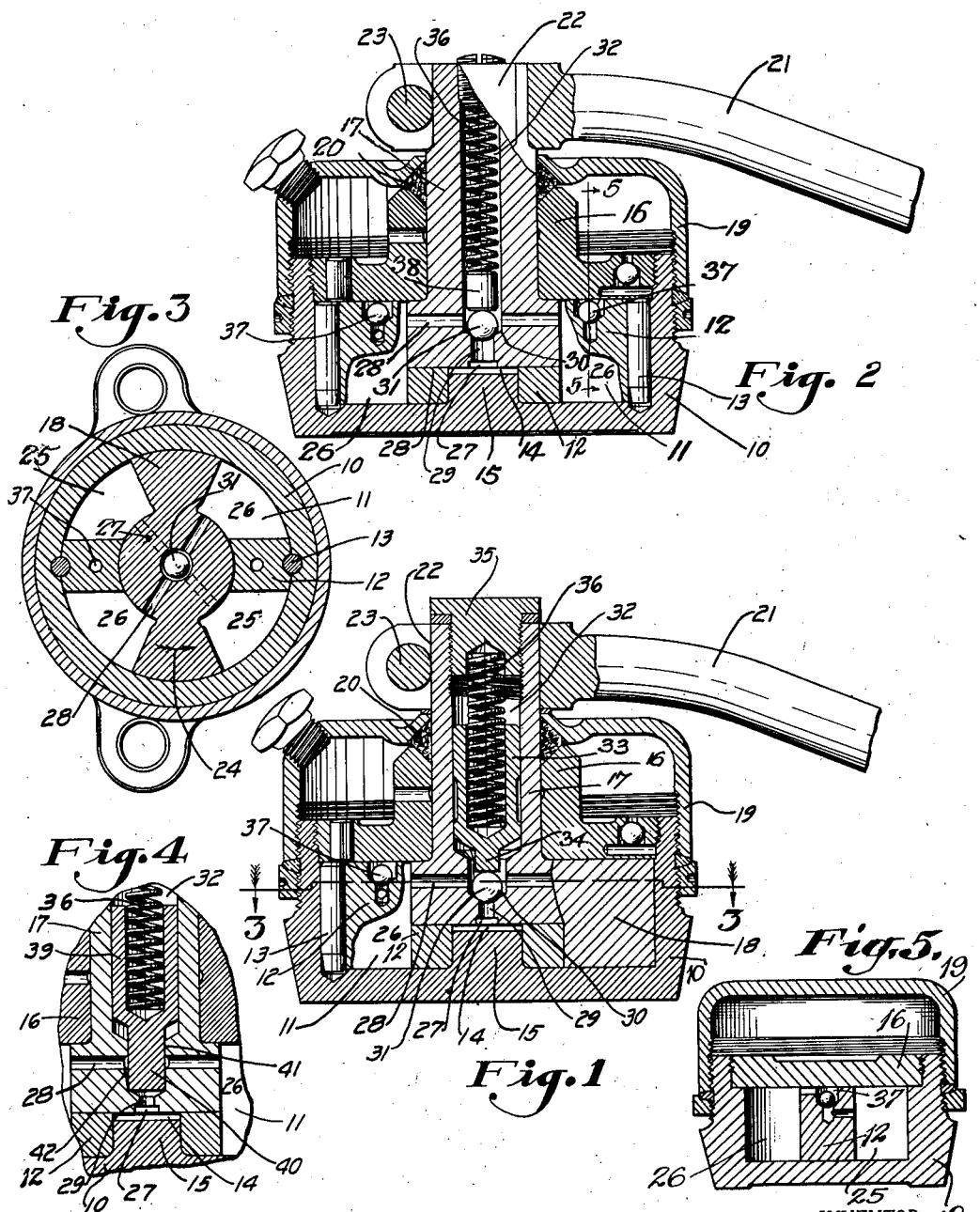
Witness
E. C. McRae
INVENTOR.
Henry Ford.
BY
E. L. Davis
ATTORNEY.

Patented Nov. 22, 1932

1,888,716

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

HYDRAULIC SHOCK ABSORBER

Application filed June 11, 1930. Serial No. 460,312.

The object of my invention is to provide a hydraulic shock absorber of simple, durable, and inexpensive construction. My improved shock absorber is of the rotary vane, commonly known as the "Houdaille" type shock absorber.

More particularly my invention comprises a structure wherein the ordinary needle valve adjusting screw, usually associated with this type of shock absorber, is dispensed with and a spring loaded valve substituted therefor, which valve serves to maintain a constant resistance to the flow of the hydraulic medium.

In all types of hydraulic shock absorbers of which the applicant is familiar, either a fixed or an adjustable needle valve is provided through which the fluid medium is forced during an oscillation of the shock absorber. With all such shock absorbers a medium having a substantially uniform viscosity over a wide temperature range is needed or else a resetting of the needle valve adjustment for each change in temperature is required. It may be readily seen that if a constant adjustment of needle valve is maintained for both warm and cold weather and the viscosity of the fluid is varied due to temperature changes, the shock absorbing action will thereby be varied to defeat the purpose of the shock absorber. My improved device produces a predetermined shock absorbing action for each adjustment of the device regardless of the viscosity of the medium used so that ordinary machine oil may be used as the fluid therein instead of the relatively expensive glycerine now required. Machine oil has a further advantage in that it is a much superior lubricant so that the wear on the parts is lessened to thereby prolong the life of the structure.

With these and other objects in view my invention consists in the arrangement, construction, and combination of the various parts of my improved device, as described in my specification, claimed in my claims, and illustrated in the accompanying drawing, in which:

Figure 1 shows a vertical central sectional view through my improved shock absorber, parts of the same being oriented to better illustrate the construction.

Figure 2 shows a central vertical sectional view, similar to Figure 1, illustrating an alternate adaptation of my invention.

Figure 3 shows a sectional view taken on the line 3—3 of Figure 1, and

Figure 4 shows a fragmentary sectional view illustrating still another alternate structure in which my invention is incorporated.

Figure 5 shows a sectional view, taken on the line 5—5 of Figure 2.

Referring to the accompanying drawing, I have used the reference numeral 10 to indicate generally a cup shaped housing commonly associated with vane type shock absorbers which housing is provided with a circular bore 11 through which a stationary vane 12 is diametrically secured across the bore by means of a pair of pins 13. The center portion of this vane is provided with an opening 14 which is piloted on a lug 15 projecting upwardly from the bottom of the housing 10 which serves to reinforce the center portion of the vane.

A head member 16 is screwed into the upper part of the bore 11 and a shaft 17 is rotatably mounted in a suitable bearing formed in this head member to rotate axially in the bore 11. That portion of the shaft 17 within the bore 11 is provided with a pair of diametrically opposed rotary vanes 18, each of which operates in one of the chambers formed by the stationary vanes 12 bisecting the bore 11. Thus, oscillation of the shaft 17 oscillates the rotary vanes in their respective chambers on each side of the stationary vanes.

I have provided an inverted cup shaped cover 19 which is screwed down over the housing 10 directly above the head 16. A ring shaped packing member 20 is provided around the shaft 17 between the cover 19 and the head 16 which co-acts with the shaft 17 to form an oil tight joint. This cover 19 is so shaped that the space between it and the head 16 forms an oil reservoir, the purpose of which is to provide a reserve oil supply for the device. The outer end of the shaft 17 is squared at 22 to receive a suitable operating arm 21 which is secured thereto by means of a bolt 23.

Referring to Figure 3, it may be seen that when the vanes 18 are oscillated in a counter-clockwise direction, as shown by the arrow 24, both of the chambers 25 which are on the advancing side of the vanes 18 will be placed under an equal pressure, while both of the chambers 26 which are on the retreating side of the vanes will be placed under a suction. The lower end of the shaft 17 is provided with a diametrical slot 27 connecting the two chambers 25 to thereby equalize the pressures therein. Likewise, a transverse drilled opening 28 is provided through the upper section of that portion of the shaft within the head 16 which opening connects the two chambers 26. I have provided an axial bore 29 through the shaft 17 which intersects both the slot 27 and the opening 28 to thereby form a connecting passageway between the two sets of chambers, 25 and 26. Thus, a counter-clockwise rotation of the vane 18 compresses the oil in both chambers 25 thereby forcing it up through the bore 29 and out through the openings 28 into the chambers 26.

In devices of this character, it has been customary to provide an adjustable needle valve for regulating the flow of oil through the bore 29 to thereby adjust the shock absorbing action. However, unless a fluid having a constant viscosity is used, frequent adjustments are necessary to insure uniform action for the device. In the device shown herein, I have provided means whereby a predetermined resistance or checking action is impressed on the oil flowing through the bore 29, irrespective of the viscosity of the oil.

Referring to Figure 1, a ball seat 30 is formed in the upper end of the bore 29 between the opening 28 and the slot 27 and a suitable ball 31 is disposed on this seat. The upper portion of the shaft 17 is provided with an axial bore 32 in which a plunger 33 is reciprocally mounted. The lower end of the plunger 33 is provided with an extension 34 which bears against the top of the ball 31. The outer end of the bore 32 is provided with a cap 35 threaded therein and a helical compression spring 36 is disposed between this cap on the plunger 33 to at all times resiliently urge the plunger downwardly to thereby urge the ball 31 against the ball seat 30. When sufficient pressure is generated in the oil in the chambers 25 the ball 31 is lifted off the seat 30 to allow the discharge of the oil. By varying the pressure of the spring 36 the shock absorbing action may be adjusted.

It may be readily seen that the viscosity of the fluid in the device has no effect upon its flow through the regulating valve so that a predetermined resistance is given to the counter-clockwise movement of the shaft 17 regardless of the viscosity of the fluid.

As a positive check is provided by this regulating valve against the clockwise movement of the vanes 18 other means must be provided for allowing the oil to flow from the chambers 26 back to the chambers 25 during the return movement of the arm 21. As this is the return stroke of the shock absorber, very little checking resistance is required or permitted during this stroke. A pair of ball check valves 37 are mounted in the stationary vanes 12 which are arranged so as to allow the fluid to flow relatively freely from the chambers 26 to the chambers 25 but which positively restricts flow of oil in the reverse direction.

I have thus provided a device, the rotation of which when operating in a counter-clockwise direction will be restricted in proportion to the pressure of the spring 36 and irrespective of the viscosity of the fluid used therein.

Referring to Figure 2, I have shown an alternate structure wherein a simple cylindrical block 38 is provided in place of the plunger 33. This structure is somewhat cheaper to manufacture and operates with sufficient reliability for most shock absorbers.

Referring to Figure 4, I have shown still another alternate structure wherein a plunger 39 is reciprocally mounted in the bore 32, which plunger is provided with a piston valve 40 formed on its lower end. The piston 40 extends into a bore 41 which intersects the opening 28 so as to close this opening from communication with the slot 27. When sufficient pressure is generated beneath the plunger 40 it is raised against the action of the spring 36. The novel feature in this construction is that I provide a tapered groove 42 extending the length of the bore 40 which allows an increased flow of oil from the slot 27 to the opening 28 as the plunger is forced upwardly. This device eliminates any tendency of the device to chatter when oscillated rapidly.

Among the many advantages arising from the use of my improved device it may be well to mention that ordinary lubricating oil having a wide range of viscosity may be used as the fluid medium therein and still a uniform resistance for the shock absorbing action will be at all times maintained.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In a fluid shock absorber having a compression chamber and an expansion chamber and a passageway connecting said chambers, the actuation of the shock absorber forcing the fluid to flow from the compression chamber through the passageway into the expansion chamber, a valve cylinder in communication with said passageway and a spring actuated piston type relief valve disposed in said cylinder and reciprocally mounted so that in its extended position said flow is resiliently obstructed and in its contracted position the passageway is unobstructed, said cylinder in which said piston is mounted having a tapered longitudinal slot therein forming a by-pass around said piston, said slot being substantially covered by the piston when it is extended by its spring and progressively uncovered thereby as the piston is reciprocated against this spring pressure whereby a cushioning effect will result in the closing of said relief valve to prevent chattering thereof.

2. In a fluid shock absorber, a housing having a cylindrical fluid containing bore therein, a stationary vane diametrically bisecting said bore, a rotary vane diametrically bisecting said bore and co-acting with the stationary vane to form four segmental fluid chambers, a pair of axially spaced passageways extending through said rotary vane connecting the diametrically opposite pairs of chambers, an axial bore in said rotary vane forming a relief valve cylinder which intersects both of said passageways, and a spring actuated piston reciprocally mounted in said cylinder so as to resiliently restrict the flow of fluid in one direction between said passageways, said cylinder having a tapered groove extending the length thereof so as to allow a gradually increased flow of fluid from one pair of chambers to the other as the piston is reciprocated against its spring, whereby a cushion effect will result on the return movement of the piston to prevent chattering thereof.

HENRY FORD.